United States Patent
Liu (10) Patent No.: US 11,009,058 B2
(45) Date of Patent: May 18, 2021

(54) ANCHORING PART AND APPARATUS FOR CONNECTING TWO PARTS

(71) Applicant: Illinois Tool Works Inc., Glenview, IL (US)

(72) Inventor: Weibin Liu, Shanghai (CN)

(73) Assignee: Illinois Tool Works Inc., Glenview, IL (US)

( * ) Notice: Subject to any disclaimer, the term of this patent is extended or adjusted under 35 U.S.C. 154(b) by 410 days.

(21) Appl. No.: 15/797,507

(22) Filed: Oct. 30, 2017

(65) Prior Publication Data

US 2019/0113062 A1    Apr. 18, 2019

(30) Foreign Application Priority Data

Oct. 13, 2017 (CN) .......................... 201710953883.1

(51) Int. Cl.
| | | |
|---|---|---|
| *F16B 37/04* | (2006.01) | |
| *F16B 13/12* | (2006.01) | |
| *F16B 21/02* | (2006.01) | |
| *F16B 21/08* | (2006.01) | |

(52) U.S. Cl.
CPC ............ *F16B 13/124* (2013.01); *F16B 21/02* (2013.01); *F16B 21/086* (2013.01)

(58) Field of Classification Search
CPC ....... F16B 13/04; F16B 13/08; F16B 13/0833
USPC .......................... 411/183, 174, 176, 177, 182
See application file for complete search history.

(56) References Cited

U.S. PATENT DOCUMENTS

| | | | | |
|---|---|---|---|---|
| 4,179,977 A | * | 12/1979 | van Buren, Jr. ....... | F16B 37/043 411/182 |
| 4,416,048 A | * | 11/1983 | Otte ........................ | A47K 13/26 29/525.04 |
| 4,652,192 A | * | 3/1987 | Schaller .................... | F16B 5/06 411/182 |
| 4,713,152 A | * | 12/1987 | Walsh .................. | B01D 53/326 204/410 |
| 4,743,152 A | * | 5/1988 | Nakayama ............ | F16B 37/043 411/182 |
| 4,828,439 A | * | 5/1989 | Giannuzzi ............. | F16B 13/061 411/37 |
| 4,906,152 A | * | 3/1990 | Kurihara ............... | F16B 37/042 174/138 D |
| 5,094,578 A | * | 3/1992 | Light ........................ | F16B 2/10 248/74.5 |
| 5,226,767 A | * | 7/1993 | Foerster, Jr. ......... | E04F 13/0832 411/340 |
| 5,755,543 A | * | 5/1998 | Culpen ................... | F16B 35/02 411/419 |
| 5,947,672 A | * | 9/1999 | Cohen ....................... | G09F 3/04 40/310 |

(Continued)

Primary Examiner — Gary W Estremsky
(74) Attorney, Agent, or Firm — Quarles & Brady LLP (57) ABSTRACT

An anchoring part, comprising: an anchoring rod that has a plurality of side walls, and a plug hole extending along a height direction of the anchoring rod; a head portion that surrounds the anchoring rod and is disposed at an upper end of the anchoring rod; at least one elastic fin that is formed by extending outwardly obliquely from at least one of the sidewalls; wherein the anchoring rod further comprises a plurality of corner portions connecting adjacent sidewalls, the plurality of corner portions being provided with locking notches at the positions adjacent to a lower surface of the head portion, respectively.

19 Claims, 6 Drawing Sheets

(56) References Cited

U.S. PATENT DOCUMENTS

| | | | | |
|---|---|---|---|---|
| 6,012,889 A * | 1/2000 | Robbins | ............... | F16B 37/14 411/372.6 |
| 6,213,700 B1 * | 4/2001 | Everard | ............ | F16B 5/0258 411/182 |
| 6,315,510 B1 * | 11/2001 | Sturies | ............... | F16B 13/00 411/182 |
| 6,659,698 B2 * | 12/2003 | Kirchen | ........... | B60R 16/0222 411/182 |
| 6,884,015 B1 * | 4/2005 | Takegawa | ......... | F16B 37/0864 411/287 |
| 7,008,159 B2 * | 3/2006 | Dendo | ............... | F16B 5/0258 411/182 |
| 7,018,153 B2 * | 3/2006 | Behle | ................ | F16B 33/004 411/182 |
| 7,179,013 B2 * | 2/2007 | Benedetti | ............ | F16B 5/123 24/292 |
| 7,278,810 B2 * | 10/2007 | Bauer | ............... | F16B 37/042 411/36 |
| 8,348,569 B2 * | 1/2013 | Tournier | ............ | F16B 37/044 411/108 |
| 9,011,061 B2 * | 4/2015 | Hofmann | ............ | F16B 33/004 411/182 |
| 9,533,719 B2 * | 1/2017 | Tejero Salinero | ........ | F16B 5/02 |

\* cited by examiner

ANCHORING PART AND APPARATUS FOR CONNECTING TWO PARTS

RELATED APPLICATIONS

This application relates to and claims priority benefits from Chinese Application No. 2017109538811, entitled "Anchoring Part and Apparatus for Connecting Two Parts," filed Oct. 13, 2017, which is hereby incorporated by reference in its entirety

TECHNICAL FILED

The present disclosure relates to anchoring part and an apparatus comprising the anchoring part for connecting two parts.

BACKGROUND

In the automobile industry, it is frequently needed to use an anchoring part together with a fastening part (e.g., a bolt) to connect an inner layer panel and an outer layer panel (or other components) together. A mourning step usually includes: pre-inserting the anchoring part into a mounting hole of the inner layer panel, covering the outer layer panel over the inner layer panel, and then causing the fastening part to pass through the outer layer panel and be inserted into the anchoring part, and securely connecting the inner and outer layer panels together by securing the fastening part in the anchoring part.

The anchoring part employed in the prior art has drawbacks that an insertion force is too large but an anti-pulling force is not large enough. If the insertion force of the anchoring part is too large, it will be time-consuming and laborious for workers to mount. Meanwhile, if the anti-pulling force of the anchoring part is not large enough, a small pulling force will cause the anchoring part to be accidentally pulled out of the inner layer panel.

SUMMARY OF THE INVENTION

An objective of the present disclosure is to at least solve one of the above technical problems.

According to a first aspect of the present disclosure, the present disclosure provides an anchoring part, comprising: an anchoring rod that has a plurality of side walls, and a plug hole extending along a height direction of the anchoring rod; a head portion that surrounds the anchoring rod and is disposed at an upper end of the anchoring rod; at least one elastic fin that is formed by extending outwardly obliquely from at least one of the sidewalls; wherein the anchoring rod further comprises a plurality of corner portions connecting adjacent sidewalls, the plurality of corner portions being provided with locking notches at the positions adjacent to a lower surface of the head portion, respectively.

According to a second aspect, the present disclosure provides an apparatus for connecting two parts, comprising an anchoring part and a fastening part. The anchoring part comprises: an anchoring rod that has a plurality of side walls and a plug hole extending along a height direction of the anchoring rod; a head portion that surrounds the anchoring rod and is disposed at an upper end of the anchoring rod; at least one elastic fin that is formed by extending outwardly obliquely from at least one of the sidewalls; wherein the anchoring rod may be inserted into a mounting hole of a first panel, a shape of the mounting hole of the first panel being substantially matched with a cross-section shape of the anchoring rod, the first panel may be held between the at least one elastic fin and the head portion, and an upper surface of the head portion forms a contact face for a second part. The fastening part has a head portion and a pin portion that has an external thread and extends from the head portion, wherein the pin portion may be threaded (rotated) into the plug hole of the anchoring rod to thereby secure the fastening part into the anchoring rod. The anchoring rod further comprises a plurality of corner portions that connect adjacent sidewalls, the plurality of corner portions being provided with locking notches at the positions adjacent to a lower surface of the head portion, respectively; a distance by which the locking notches extend along a height direction of the anchoring rod is greater than or equal to a thickness of the first panel. The anchoring rod is configured to be capable of rotating by a certain angle as the pin portion is threaded into the plug hole of the anchoring rod, such that an edge of the mounting hole of the first panel is engaged in the locking notches of the anchoring rod.

According to a third aspect, the present disclosure provides an anchoring part, comprising: an anchoring rod that has a plurality of side walls, and a plug hole extending along a height direction of the anchoring rod; a head portion that surrounds the anchoring rod and is disposed at an upper end of the anchoring rod; at least one elastic fin that is formed by extending outwardly obliquely from at least one of the sidewalls; wherein a recess is provided at a junction between at least one elastic fin and the at least one sidewall.

DETAILED DESCRIPTION OF EMBODIMENTS

Hereinafter, various preferred embodiments of the present disclosure will be described with reference to the drawings constituting part of the description. It should be noted that although terms indicating directions (such as "front," "back," "up," "down," "left," and "right") are used herein to describe various exemplary structural parts and elements of the present disclosure, these terms are only for the convenience of description, which are determined based on the exemplary orientations shown in the drawings. Because the embodiments disclosed in the present disclosure may be arranged according to different directions, these directional terms are only used for illustration and should not be regarded as limiting. In possible scenarios, same or like reference numerals are used to indicate the same or like components.

Figure 1A:
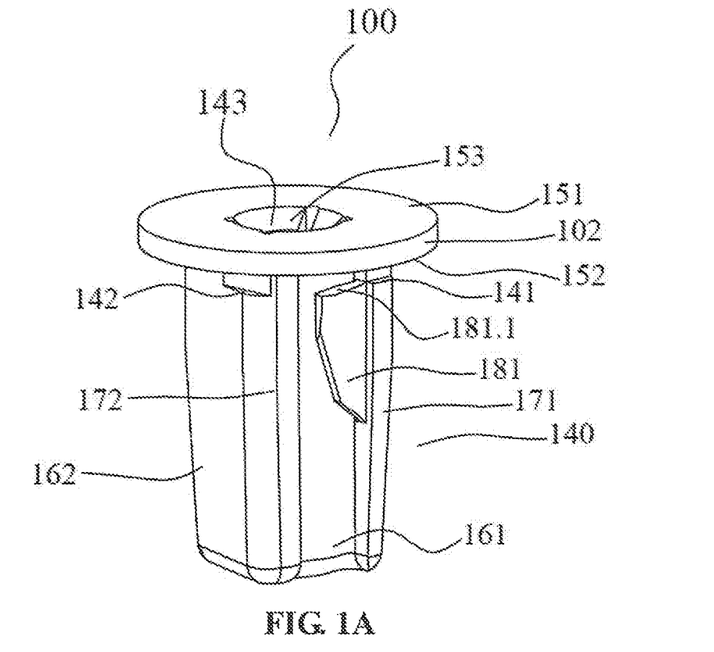
FIG. 1A is a perspective structural diagram of an anchoring part according to a first embodiment of the present disclosure.
Figure 1B:
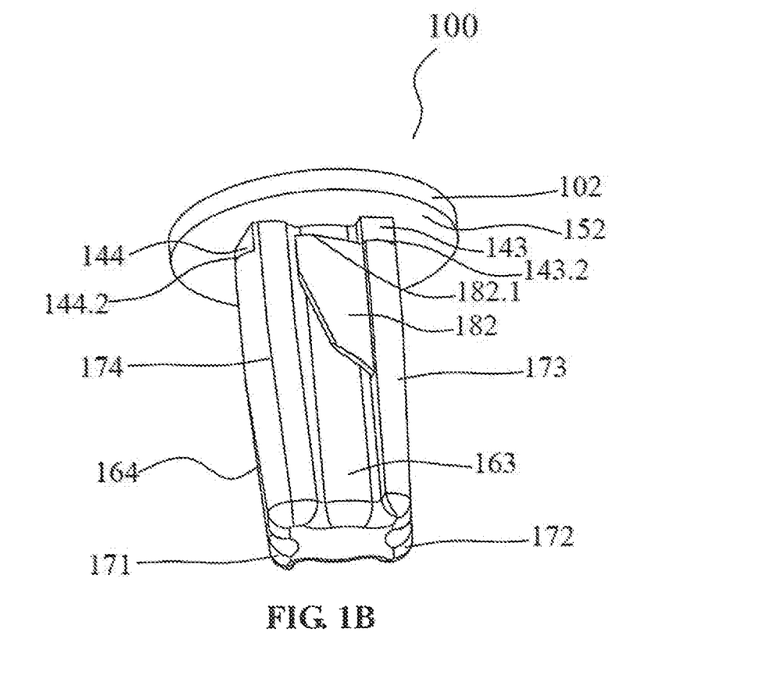
FIG. 1B is a perspective structural diagram of the anchoring part shown in FIG. 1A from another view angle.
Figure 1C:
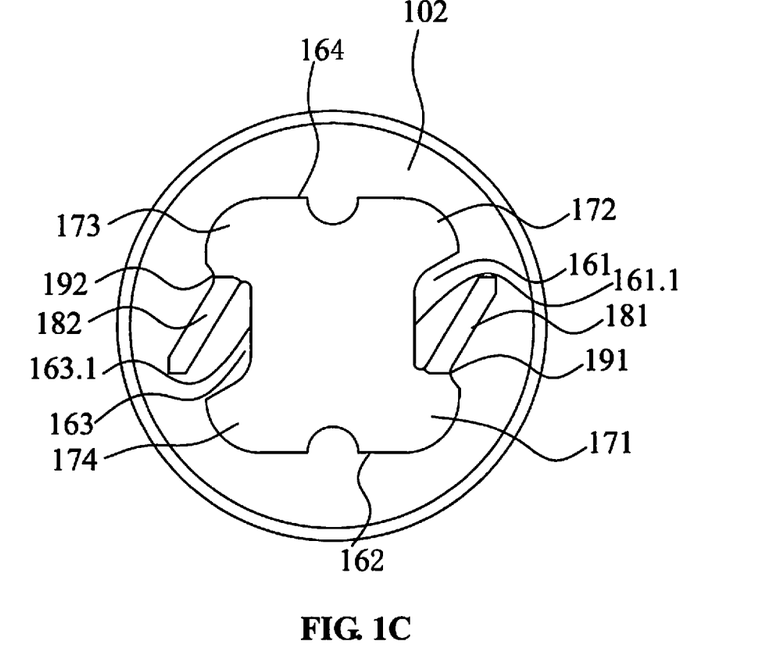
FIG. 1C is a bottom view of the anchoring part in FIG. 1A.

FIGS. 1A and 1B are perspective structural diagrams of an anchoring part 100 according to a first embodiment of the present disclosure from a front view angle and a back view angle, respectively, and FIG. 1C is a bottom view of the anchoring part in FIG. 1A.

As shown in FIGS. 1A, 1B and 1C, the anchor part 100 comprises an anchoring rod 140, a head portion 102, and a pair of elastic fins 181, 182. According to an example of the present disclosure, the anchoring part 100 is integrally made of plastics with an injection molding process.

Figure 2A:
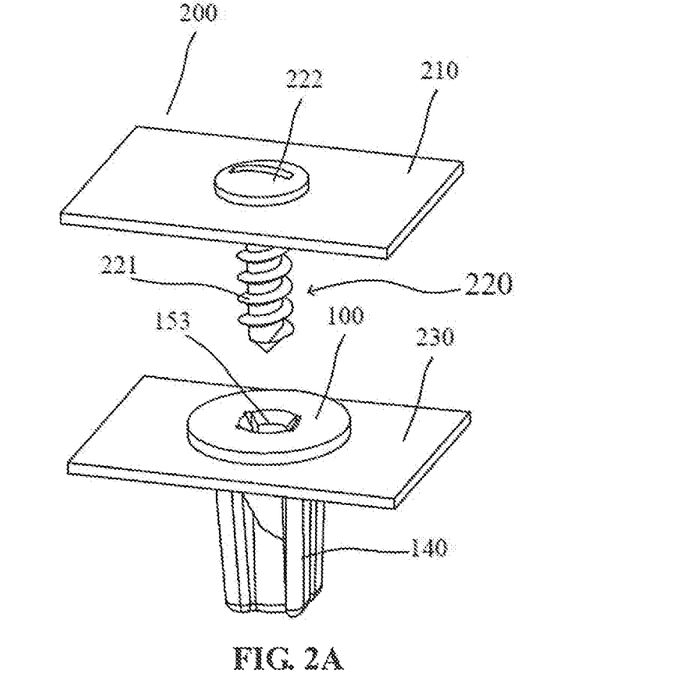
FIG. 2A is a diagram showing a working process that an apparatus for connecting two parts connects two panels according to the present disclosure.
Figure 3A:
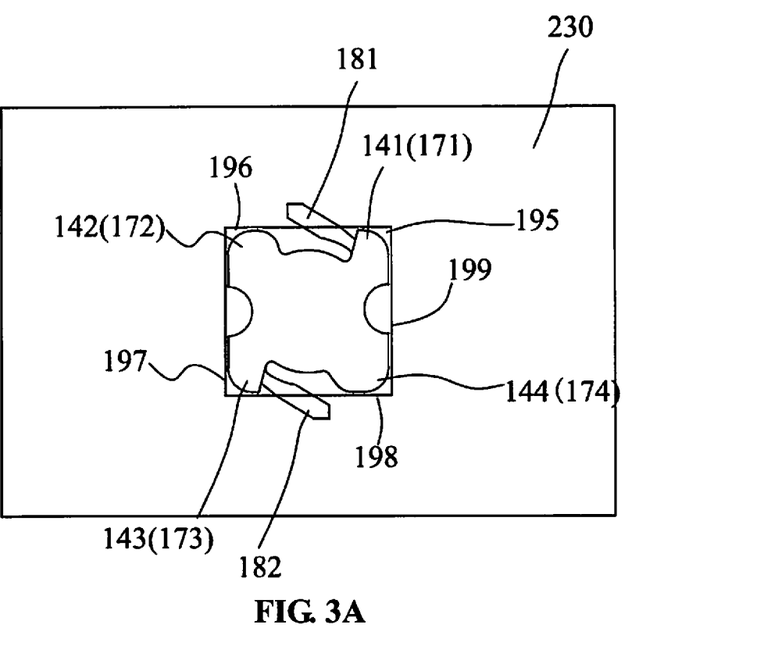
FIGS. 3A and 3B are bottom views when an anchoring part according to the present disclosure is mounted in a first panel, which show two mounting states of the anchoring part.

The anchoring rod 140 has a cross section of a substantially rectangular shape. The anchoring rod has four sidewalls 161, 162, 163 and 164, with adjacent sidewalls being joined by corner portions 171, 172, 173, and 174. The anchoring rod 140 further has a plug hole 153 extending along a height direction of the anchoring rod 140 for receiving a fastening part 220 (as shown in FIG. 2A). The cross section of the anchoring rod 140 may also assume other polygonal shapes, as long as the shape of the anchoring rod 140 matches with that of a mounting hole 195 of a first panel 230 to be inserted (as shown in FIG. 3A). The plug hole 153 may be a through hole or a non-through hole, so long as it may receive the fastening part 220. As shown in FIG. 1B, the plug hole 153 is invisible from a bottom portion of the anchoring rod 140.

The head portion 102 surrounds the anchoring rod 140 and is provided at an upper end of the anchoring rod 140, thereby forming a flange structure on the anchoring rod. The head portion 102 has an upper surface 151 and a lower surface 152. According to an example, an outer profile of the head portion is substantially round; of course, outer profiles with other shapes are also feasible.

A pair of elastic fins 181, 182 are provided on opposite sidewalls 161, 163, respectively. The elastic fins 181, 182 are formed by extending outwardly obliquely from the sidewalls 161, 163, respectively, and are joined with the sidewalls 161, 163 along a height direction of the anchoring rod 140. Top ends 181.1, 181.2 of the elastic fins 181, 182 are spaced from the lower surface 152 of the head portion 102 by a predetermined distance D. The predetermined distance D is greater than or equal to a thickness of the first panel 230 into which the anchoring rod 140 is to be inserted. According to an example of the present disclosure, the predetermined distance D is slightly greater than the thickness of the first panel 230 into which the anchoring rod 140 is to be inserted. In this way, an accommodation space that may accommodate the first panel 230 is formed between the top ends 181.1, 182.1 of the elastic fins 181, 182 and the lower surface 152 of the head portion 102. Because the elastic fins 181, 182 have elasticity, during a process in which the elastic fins 181, 182 are inserted along with the anchoring rod 180 into the mounting hole 195 of the first panel 230, the elastic fins 181, 182 will be elastically deformed to be contracted inwardly; while after the elastic fins 181, 182 pass through the mounting hole 195 of the first panel 230, the elastic fins 181, 182 may be spread under an action of their own elasticity. In this way, the first panel 230 may be held between the top ends 181.1, 181.2 of the elastic fins 181, 182 and the head portion 102, thereby securing the anchoring part 100 on the first panel 230.

Root portions of the elastic fins 181, 182 connected with the sidewalls 161, 163 are proximal to corresponding corner portions 171, 173. In addition, grooves 161.1, 161.3 are provided at portions on the sidewalls 161, 163 through which the elastic fins 171, 182 extend. Such arrangement provides enough deformation space for the elastic fins 181, 182, thereby guaranteeing that the anchoring part 100 may be inserted into the mounting hole 195. For the convenience of manufacturing, the grooves 161.1, 163.1 extend along a whole height direction of the corresponding sidewalls 161, 163.

Figure 1D:
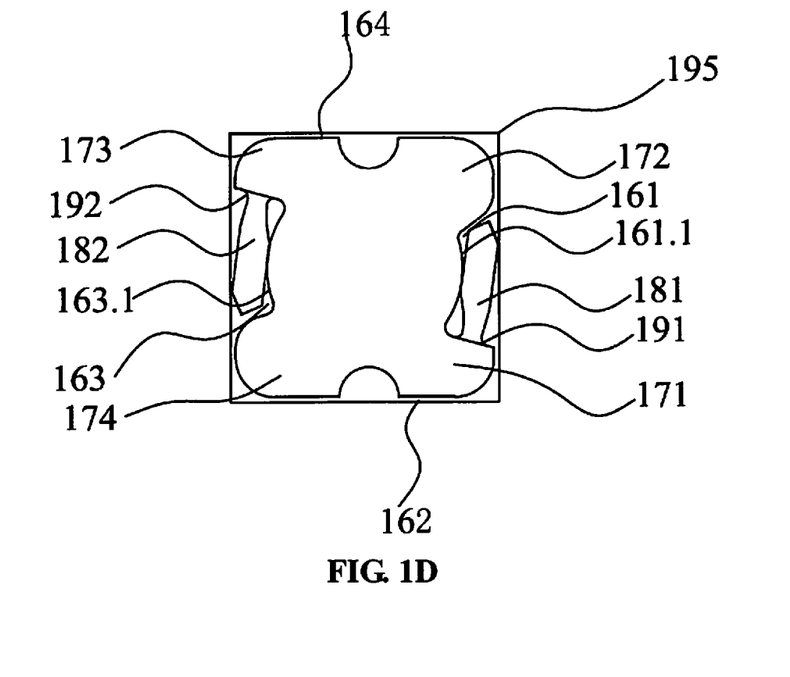
FIG. 1D is a bottom view of the anchoring part in FIG. 1 showing a process during which the anchoring part is inserted into a mounting hole of a first panel.

FIG. 1D is a bottom view of the anchoring part in FIG. 1, showing a process during which the anchor part is inserted into a mounting hole of a first panel. For a clear illustration, in FIG. 1D, the head portion of the anchoring part 100 is removed. As shown in FIG. 1D, the elastic fins 181, 182 are passing through the mounting hole 195, such that the elastic fins 181, 182 are compressed inwardly by an edge of the mounting hole 195 to produce a deformation.

As shown in FIGS. 1C and 1D, recesses 191, 192 are provided at junctions between the elastic fins 181, 182 and sidewalls 161, 163. The recesses 191, 192 is provided on an outer portion of the junction between the elastic fins 181, 182 and the sidewalls such that the junctions between the elastic fins 181, 182 and the sidewalls 161, 163 are distant from the outer profile of the sidewalls 161, 163 by a certain distance. In this way, during the process in which the anchoring rod 140 is inserted into the mounting hole 195 of the first panel 230, the recesses 191, 192 also cause the junctions between the elastic fins 181, 182 and the sidewalls 161, 163 to be spaced from the edge of the mounting hole 195 by a certain distance. With such arrangement, during the process of inserting the anchoring rod 140 into the mounting hole 195, the junctions between the elastic fins 181, 182 and the sidewalls 161, 163 allow the anchoring rod 140 to be inserted into the mounting hole 195 by only producing a very small deformation or without producing any deformation. Because it is relatively difficult to make the junctions between the elastic fins 181, 182 and the sidewalls 161, 163 deform, while arrangement of the recesses 191, 192 allows the anchoring rod 140 to be inserted into the mounting hole 195 without a need of the junctions between the elastic fins 181, 182 and the sidewalls 161, 163 producing a relatively large deformation, an insertion force for inserting the anchoring rod 140 into the mounting hole 195 may be substantially reduced.

As still shown in FIGS. 1A and 1B, a width of a lower portion of the elastic fins 181, 182 is gradually narrowed downwardly. Such arrangement may not only reduce the insertion force for inserting the anchoring part 100 into the mounting hole 195 of the first panel 230, but also may more easily guide the elastic fins 181, 182 to be inserted into the mounting hole 195 of the first panel 230.

It may be seen more clearly in FIG. 1B that locking notches 141, 142, 143, 144 are provided at positions on the corner portions 171, 172, 173, and 174 adjacent to the lower surface of the head portion 102. A distance by which the locking notches 141, 142, 143, and 144 extend along the height direction of the anchoring rod 140 is substantially equal to the predetermined distance D. Therefore, bottom faces 141.2, 142.2, 143.2, and 144.2 of the locking notches 141, 142, 143, and 144 are substantially in flush with the top ends 181.1, 182.1 of the elastic fins 181, 182. Because the shape of the cross section of the anchoring rod 140 matches with the shape of the mounting hole 195 of the first panel 230, without providing the locking notches 141, 142, 143, and 144 on the corner portions 171, 172, 173, and 174, the anchoring rod 140 would not be unable to rotate relative to the mounting hole 195 after being inserted into the mounting hole 195 of the first panel 230. However, due to arrangement of the locking notches 141, 142, 143, and 144 on the corner portions 171, 172, 173, and 174 of the present disclosure, after the anchoring rod 140 is inserted into the mounting hole 195 of the first panel 230 and the first panel 230 is held between the elastic fins 181, 182 and the head portion 102, the anchoring rod 140 may rotate a certain angle inside the mounting hole 195.

Figure 1E:
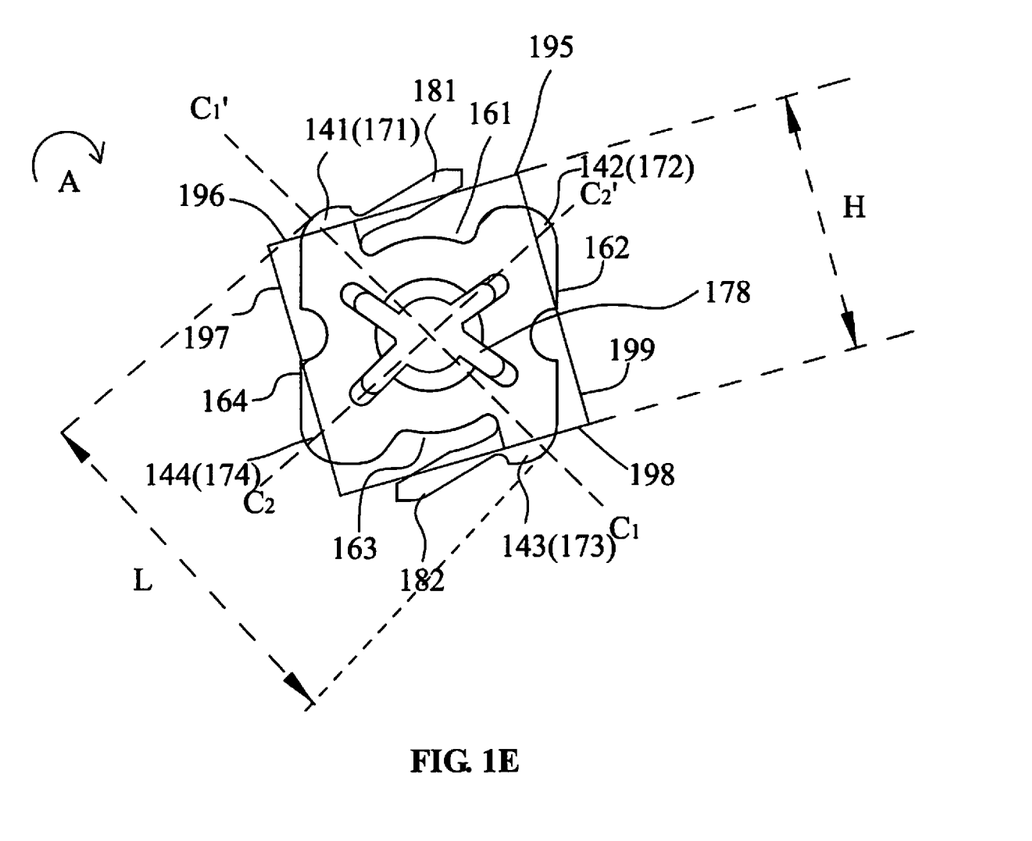
FIG. 1E is a top view of the anchoring part in FIG. 1C with a head portion removed, which shows that the anchoring part rotates a certain angle relative to the mounting hole of the first panel.

FIG. 1E is a top view of the anchoring part 100 in FIG. 1C with a head portion removed, which shows that the anchoring part 100 rotates a certain angle relative to the mounting hole 195 of the first panel 230. As shown in FIG. 1E, the anchoring rod 140 rotates a certain angle relative to the mounting hole 195 clockwise. With rotation of the anchor rod 140, four side edges 196, 197, 198, 199 of the mounting hole 195 are gradually joined with the locking notches 141, 142, 143, and 144. Therefore, the first panel 230 is not only held between the top ends 181.1, 182.1 of the elastic fins 181, 182 and the head portion 102, but also held between the corner portions 171, 172, 173, and 174 below the locking notches 141, 142, 143, 144 and the head portion 102 above the locking notches 141, 142, 143, and 144. This greatly increases the anti-pulling force of the anchoring portion 100 relative to the first panel 230, such that the anchoring part 100 is more securely fastened in the mounting hole 195 of the first panel 230 and will not be easily pulled out.

As still shown in FIG. 1E, depth of the locking notches 141, 142, 143, and 144 is arranged such that the length L of the diagonal lines $C_1C_1'$, $C_2C_2'$ of the cross section of the anchoring rod 140 minus the depth of the locking notches 141, 142, 143, and 144 is still greater than the width H of the mounting hole 195. In this way, the rotation angle of the anchoring rod 140 relative to the mounting hole 195 is less than 45 degrees. According to an example of the present disclosure, the locking notches 141, 142, 143, and 144 are arranged to enable the anchoring rod 140 to rotate 15 degrees relative to the mounting hole 195. After the anchoring rod 140 rotates 15 degrees relative to the mounting holes 195, the anchoring rod 140 will be blocked by the side edges 196, 197, 198, and 199 of the mounting hole 195 from continuing rotation. Such arrangement may guarantee that movement of the anchoring part 100 itself in the rotating direction is restricted when the fastening part 220 (see FIG. 2A) is rotationally threaded into the anchoring part 100.

In the embodiments shown in FIGS. 1A-1E, because the anchoring part 100 is only arranged with a pair of elastic fins 181, 182 disposed on the opposite sidewalls 161, 163, the insertion force for inserting the anchoring part 100 into the mounting hole 195 of the first panel 230 may be reduced, comparing with the case that provides an elastic fin on each side wall. Because the present disclosure also provides locking notches 141, 142, 143, and 144 on the anchoring rod 140, although only a pair of elastic fins 181, 182 are provided, the anchoring rod 140 of the present disclosure still has relative large anti-pulling force. Moreover, compared with the case that provides an elastic fin on each sidewall, the present disclosure has a larger anti-pulling force due to provision of the locking notches 141, 142, 143, and 144. However, it needs to be noted that in accordance with the essence of the present disclosure, any number of elastic fins will fall within the protection scope of the present disclosure.

FIG. 2A is a diagram showing a working process that an apparatus 200 for connecting two parts connects two panels according to the present disclosure.

As shown in FIG. 2A, the apparatus 200 for connecting two parts is arrangeable for fastening a first panel 230 and a second panel 210. A shape of the mounting hole 195 of the first panel 230 matches with a shape of a cross section of an anchoring rod 140. When the shape of the cross section of the anchoring rod 140 is substantially rectangular, the shape of the mounting hole 195 of the first panel 230 is rectangle slightly greater than the rectangle of the cross section of the anchoring rod 140.

The apparatus 200 for connecting two parts comprises an anchoring part 100 and a fastening part 220. The fastening part 220 has a head portion 222, and a pin portion 221 that has an external thread and extends from the head portion 222. The pin portion 221 may be threaded into the plug hole 153 of the anchoring rod 140 so as to secure the fastening part 220 in the anchoring rod 140. According to one example, the fastening part 220 is a metallic bolt.

Figure 3B:
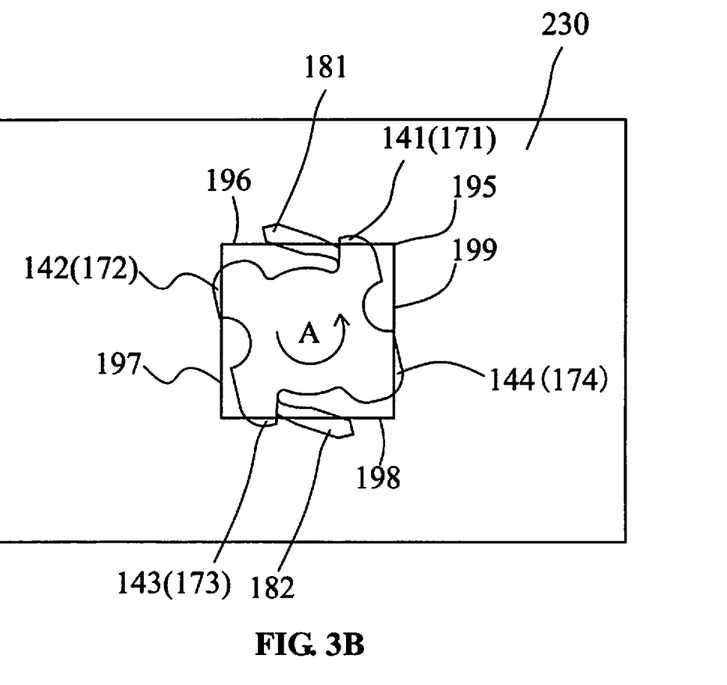

When using the apparatus 200 for connecting two parts to fasten the first panel 230 and the second panel 210, the anchoring part 100 is first pre-mounted into the mounting hole 195 of the first panel 230, such that the first panel 230 is held between the elastic fins 181, 182 of the anchoring part 100 and the head portion 102. Then, the pin portion 221 of the fastening part 220 is inserted into the plug hole 153 of the anchoring rod 140. Before the pin portion 221 of the fastening part 220 is inserted in the plug hole 153 of the anchoring rod 140, the pin portion 221 of the fastening part 220 may be threaded in the second panel 210, or the second panel 210 is covered over the first panel 230 in advance, and then the pin portion 221 of the fastening part 220 passes through the second panel 210 into the plug hole 153 of the anchoring rod 140. When driving, with a tool such as an electric drill, the pin portion 221 of the fastening part 220 to thread into the plug hole 153 of the anchoring rod 140, the anchoring rod 140 is driven by the fastening part 220 to rotate like what is shown in FIG. 1D, and after rotating for a predetermined angle, is blocked by side edges 196, 197, 198, and 199 of the mounting hole 195 from continuing rotation. At this point, by continuing driving the pin portion 221 of the fastening part 220 using a tool such as the electric drill, the pin portion 221 of the fastening part 220 may be fastened in the plug hole 153 of the anchoring rod 140. FIGS. 3A and 3B show the states before and after rotation of the anchoring part 100.

FIGS. 3A and 3B are bottom views when an anchoring part according to the present disclosure is mounted in a first panel, which show two mounting states of the anchoring part 100, wherein FIG. 3A shows that the anchoring part 100 is pre-mounted in the mounting hole 195 of the first panel 230 and the anchoring part 100 has not rotated relative to the mounting hole 195 yet; and FIG. 3B shows that the anchoring part 100 rotates a predetermined angle relative to the mounting hole 195.

Figure 2B:
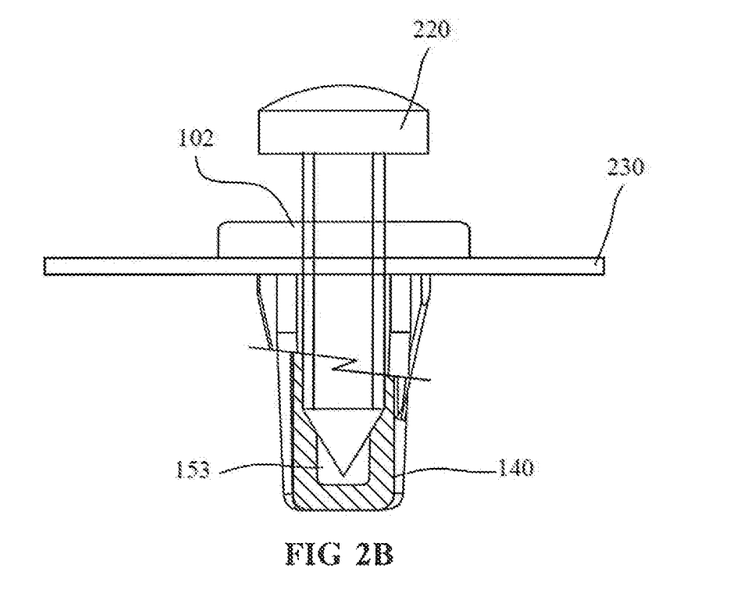
FIG. 2B shows a partial sectional view after a fastening part is threaded into the anchoring part.

FIG. 2B shows a partial sectional view after the fastening part 220 is threaded inside the anchoring part 100. As shown in FIG. 2B, an inner diameter of the plug hole 153 of the anchoring rod 140 is smaller than an outer diameter of the pin portion 221 of the fastening part 220. Because the anchoring part 100 is made of plastics, although no threads are provided on the inner wall of the plug hole 153, the pin portion 221 of the fastening part 220 may be still engaged into the inner wall of the plug hole 153 of the anchoring rod 140 by means of its external thread during the process of rotating into the plug hole 153 of the anchoring rod 140, thereby fastening the fastening part 220 into the plug hole 153 of the anchoring rod 140. As shown in FIG. 1E, a plurality of cuts 178 extending along a height direction of the anchoring rod 140 are provided on an inner wall of the plug hole 153 of the anchoring rod 140. The cuts 178 may cause the anchoring rod 140 to expand outwardly when the pin portion 221 of the fastening part 220 is rotating there into, thereby facilitating the pin part 221 to rotate into the plug hole 153.

Figure 4:
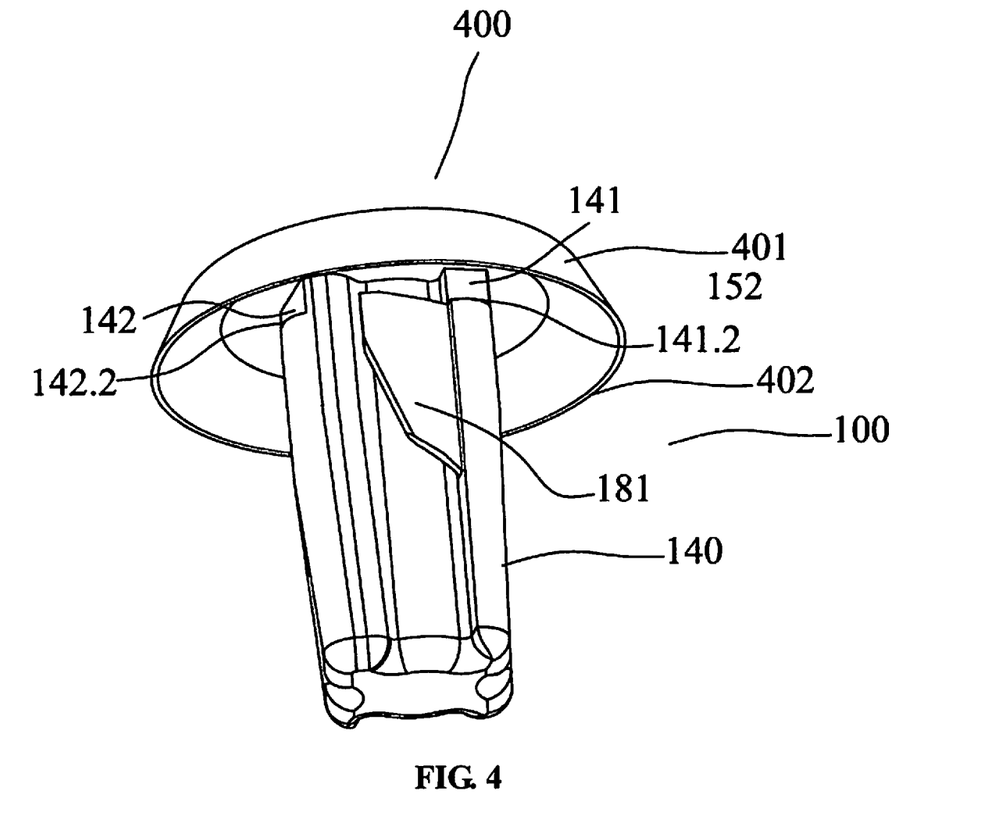
FIG. 4 is a perspective structural schematic diagram of an anchoring part according to a second embodiment of the present disclosure.

FIG. 4 is a perspective structural schematic diagram of an anchoring part according to a second embodiment of the present disclosure.

FIG. 4 shows an anchoring part 400 according to a second embodiment of the present disclosure. Compared with the anchoring part 100 in the first embodiment shown in FIG. 1A, the anchoring part 400 is jacketed with a rubber cap 401 at an outer periphery of the head portion 102. An outer edge 402 of the rubber cap 401 extends towards a lower portion of an anchoring rod 140, such that after the first panel 230 is held between the elastic fins 181, 182 and the head portion 102, the outer edge 402 of the rubber cap 401 may hermetically abut against the first panel 230. In this way, water may be prevented from entering the inside of the first panel 230 after flowing through the mounting hole 195.

Although the present disclosure has been described above with reference to the preferred embodiments shown in the drawings, it should be understood that the anchoring part of the present disclosure may have many variations without departing from the spirit, scope and background taught by the present disclosure. Those of normal skill in the art will also appreciate that different modes exist to alter the settings in the embodiments disclosed by the present disclosure, all of which fall within the spirit and scope of the claims of the present disclosure.

The present disclosure discloses an anchoring part, comprising: an anchoring rod that has a plurality of side walls, and a plug hole extending along a height direction of the anchoring rod; a head portion that surrounds the anchoring rod and is disposed at an upper end of the anchoring rod; at least one elastic fin that is formed by extending outwardly obliquely from the at least one of the sidewalls; wherein the anchoring rod further comprises a plurality of corner portions connecting adjacent sidewalls, the plurality of corner portions being provided with locking notches at the positions adjacent to a lower surface of the head portion, respectively.

I claim:

1. An anchoring part, comprising:
an anchoring rod that has a plurality of sidewalls, and a plug hole extending along a height direction of the anchoring rod;
a head portion that surrounds the anchoring rod and is disposed at an upper end of the anchoring rod;
at least one elastic fin that is formed by extending outwardly obliquely from at least one of the sidewalls;
wherein the anchoring rod further comprises a plurality of corner portions connecting adjacent sidewalls, the plurality of corner portions being provided with locking notches at positions adjacent to a lower surface of the head portion, respectively, and
wherein each of the locking notches comprise a surface that extends substantially parallel to the height direction of the anchoring rod.

2. The anchoring part according to claim 1, wherein:
the at least one elastic fin is connected to the at least one sidewalls along the height direction of the anchoring rod, wherein a top end of the at least one elastic fin is spaced from the lower surface of the head portion by a predetermined distance;
a distance by which the locking notches extends along the height direction of the anchoring rod is substantially equal to the predetermined distance.

3. The anchoring part according to claim 1, wherein:
the anchoring rod has four sidewalls and has four corner portions; and
the at least one elastic fins comprise two elastic fins, and the two elastic fins are provided on a pair of opposite sidewalls, respectively.

4. The anchoring part according to claim 2, wherein:
the anchoring part is insertable into a mounting hole of a first panel, a shape of the mounting hole of the first panel being substantially matched with a cross-section shape of the anchoring rod;
the predetermined distance is adapted to be greater than or equal to a thickness of the first panel; and
the at least one elastic fin is configured to be elastically deformed and contracted inwardly when the anchoring rod is inserted into the mounting hole of the first panel, and to spread under an action of its own elasticity when the at least one elastic fin passes through the mounting hole of the first panel; thereby the first panel is configured to be held between the top end of the at least one elastic fin and the head portion, and then the anchoring rod is configured to rotate a certain angle, such that edges of the mounting hole of the first panel are engaged in the locking notches of the anchoring rod.

5. The anchoring part according to claim 4, wherein:
the locking notches are arranged such that the anchoring rod is configured to rotate less than 45 degrees after being inserted into the mounting hole of the first panel.

6. The anchoring part according to claim 1, wherein:
recesses are provided at junctions between the at least one elastic fin and the at least one sidewall.

7. The anchoring part according to claim 1, wherein:
a width of a lower portion of the at least one elastic fin gradually downwardly narrows.

8. The anchoring part according to claim 1, wherein:
a rubber cap jackets on an outer periphery of the head portion, an outer edge of the rubber cap extending towards a lower portion of the anchoring rod.

9. The anchoring part according to claim 1, wherein:
the anchoring part is integrally formed by plastics.

10. An apparatus for connecting two parts, comprising:
an anchoring part including:
an anchoring rod that has a plurality of sidewalls, and a plug hole extending along a height direction of the anchoring rod;
a head portion that surrounds the anchoring rod and is disposed at an upper end of the anchoring rod; and
at least one elastic fin that is formed by extending outwardly obliquely from at least one of the sidewalls;
wherein the anchoring rod is insertable into a mounting hole of a first panel, a cross-sectional shape of the anchoring rod is adapted to substantially match with a shape of the mounting hole of the first panel, the first panel configured to be held between the at least one elastic fin and the head portion, and an upper surface of the head portion forming a contact face for a second part; and
a fastening part having a head portion and a pin portion that has an external thread and extends from the head portion, wherein the pin portion is configured to be threaded into the plug hole of the anchoring rod to thereby secure the fastening part into the anchoring rod;

wherein the anchoring rod further comprises a plurality of corner portions that connect adjacent sidewalls, the plurality of corner portions being provided with locking notches at positions adjacent to a lower surface of the head portion, respectively; and wherein a distance by which the locking notches extend along a height direction of the anchoring rod is adapted to be greater than or equal to a thickness of the first panel, wherein each of the locking notches comprise a surface that extends substantially parallel to the height direction of the anchoring rod, wherein the anchoring rod is configured to be rotated for a certain angle as the pin portion is threaded into the plug hole of the anchoring rod, such that edges of the mounting hole of the first panel are engaged in the locking notches of the anchoring rod, and wherein recesses are provided at junctions between the at least one elastic fin and the at least one sidewall.

11. The apparatus for connecting two parts according to claim 10, wherein:
the at least one elastic fin is connected to the at least one sidewalls along a height direction of the anchoring rod, wherein a top end of the at least one elastic fin is spaced from a lower surface of the head portion by a predetermined distance, the predetermined distance is adapted to be substantially greater than or equal to a thickness of the first panel.

12. The apparatus for connecting two parts according to claim 10, wherein:
the anchoring rod has four sidewalls and four corner portions; and
the at least one elastic fin comprises two elastic fins, the two elastic fins being provided on a pair of opposite sidewalls, respectively.

13. The apparatus for connecting two parts according to claim 10, wherein:
the notches are configured such that the anchoring rod is configured to be rotated less than 45 degrees after being inserted into the mounting hole of the first panel.

14. The apparatus for connecting two parts according to claim 10, wherein:
a rubber cap jackets an outer periphery of the head portion and an outer edge of the rubber cap extends toward a lower portion of the anchoring rod, and wherein the outer edge of the rubber cap is adapted to hermetically abut against the first panel.

15. The apparatus for connecting two parts according to claim 10, wherein:
the anchoring part is integrally formed by plastics.

16. The apparatus for connecting two parts according to claim 10, wherein:
a plurality of cuts extending along a height direction of the anchoring rod are provided on an inner wall of the plug hole of the anchoring rod to facilitate the pin portion to thread into the plug hole of the anchoring rod.

17. An anchoring part, comprising:
an anchoring rod that has a plurality of sidewalls, and a plug hole extending along a height direction of the anchoring rod;
a head portion that surrounds the anchoring rod and is disposed at an upper end of the anchoring rod;
at least one elastic fin that is formed by extending outwardly obliquely from at least one of the sidewalls, wherein the at least one elastic fin extends from a wall forming a groove provided on the at least one sidewall; and
a plurality of corner portions connecting adjacent sidewalls, wherein a locking notch is provided at a position on each of the corner portions adjacent to a lower surface of the head portion,
wherein a rounded recess is provided at an outer portion of a junction between the at least one elastic fin and the at least one sidewall, and wherein the locking notches allow the anchoring part to rotate a certain angle once it has been inserted into a mounting hole of a panel.

18. The anchoring part according to claim 10, wherein the recess is provided on an outer portion of the junction between the at least one elastic fin and the at least one sidewall such that the junction between the elastic fins and the at least one sidewall is offset from the outer profile of the sidewalls.

19. The anchoring part according to claim 17, wherein:
the at least one elastic fin is connected to at least one sidewall along a height direction of the anchoring rod, wherein a top end of the at least one elastic fin is spaced from a lower surface of the head portion by a predetermined distance.

* * * * *